United States Patent
Cho et al.

(10) Patent No.: US 9,168,956 B2
(45) Date of Patent: Oct. 27, 2015

(54) VEHICLE BODY HAVING REAR SIDE MEMBER

(71) Applicant: Hyundai Motor Company, Seoul (KR)

(72) Inventors: Sung Hoon Cho, Bucheon-si (KR); Dae Seung Kim, Gwacheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 33 days.

(21) Appl. No.: 14/137,498

(22) Filed: Dec. 20, 2013

(65) Prior Publication Data

US 2015/0042129 A1 Feb. 12, 2015

(30) Foreign Application Priority Data

Aug. 9, 2013 (KR) .................. 10-2013-0094663

(51) Int. Cl.
| B62D 21/00 | (2006.01) |
| B62D 25/08 | (2006.01) |
| B62D 25/20 | (2006.01) |
| B62D 27/02 | (2006.01) |

(52) U.S. Cl.
CPC ............ *B62D 25/08* (2013.01); *B62D 25/2027* (2013.01); *B62D 27/023* (2013.01)

(58) Field of Classification Search
CPC ........ B62D 21/00; B62D 21/02; B62D 21/03; B62D 21/08; B62D 21/09; B62D 21/10; B62D 25/20; B62D 25/2009; B62D 25/2027; B62D 27/00; B62D 27/02; B62D 27/023
See application file for complete search history.

(56) References Cited

U.S. PATENT DOCUMENTS

| 2,192,075 | A | * | 2/1940 | Gregoire .................. 296/193.02 |
| 4,676,545 | A | * | 6/1987 | Bonfilio et al. .......... 296/193.04 |
| 5,655,792 | A | * | 8/1997 | Booher ........................ 280/789 |
| 5,897,139 | A | * | 4/1999 | Aloe et al. .................... 280/781 |
| 6,334,252 | B1 | * | 1/2002 | Sato et al. .................... 29/897.2 |
| 2004/0045250 | A1 | * | 3/2004 | Takeuchi ..................... 52/655.1 |
| 2004/0100126 | A1 | * | 5/2004 | Kawabe et al. .......... 296/193.07 |
| 2004/0140693 | A1 | * | 7/2004 | Gibbianelli et al. ..... 296/203.01 |
| 2006/0097502 | A1 | * | 5/2006 | Bingham et al. ............... 280/781 |
| 2007/0246972 | A1 | * | 10/2007 | Favaretto ...................... 296/205 |
| 2008/0169681 | A1 | * | 7/2008 | Hedderly ................. 296/193.07 |
| 2010/0072786 | A1 | * | 3/2010 | Koyama et al. .......... 296/203.04 |
| 2010/0164214 | A1 | * | 7/2010 | Hartmann et al. ............. 280/781 |
| 2010/0244497 | A1 | * | 9/2010 | Honda et al. .................. 296/205 |
| 2010/0327628 | A1 | * | 12/2010 | Taguchi ................... 296/193.07 |
| 2012/0119545 | A1 | * | 5/2012 | Mildner et al. .......... 296/193.07 |

(Continued)

FOREIGN PATENT DOCUMENTS

| DE | 4204826 A1 | * | 6/1993 | ............. B62D 25/00 |
| DE | 4333557 C1 | * | 4/1995 | ............. B62D 21/00 |
| DE | 10224307 A1 | * | 12/2003 | ............. B62D 25/08 |

(Continued)

*Primary Examiner* — Glenn Dayoan
*Assistant Examiner* — Paul Chenevert
(74) *Attorney, Agent, or Firm* — Morgan, Lewis & Bockius LLP (57) ABSTRACT

A vehicle body includes: rear side members disposed at both sides of the vehicle body; a rear cross member rear having both end portions fixed to the rear side members; a rear cross member front having both end portions fixed to the rear side members, and disposed in front of the rear cross member rear; and a rear cross panel having a lower surface that is supported on and joined to the rear side members, the rear cross member rear, and the rear cross member front.

11 Claims, 13 Drawing Sheets

(56) References Cited

U.S. PATENT DOCUMENTS

| | | | |
|---|---|---|---|
| 2012/0169089 A1* | 7/2012 | Rawlinson et al. | 296/193.08 |
| 2013/0181486 A1* | 7/2013 | Tabuteau et al. | 296/204 |

FOREIGN PATENT DOCUMENTS

| | | | | |
|---|---|---|---|---|
| DE | 10227705 B4 | * | 5/2004 | B62D 21/02 |
| DE | 102004061794 A1 | * | 7/2006 | B62D 21/02 |
| DE | 102005054250 | * | 5/2007 | B62D 21/02 |
| DE | 102007006722 A1 | * | 12/2008 | B62D 25/00 |
| DE | 102010011267 A1 | * | 9/2011 | B62D 21/02 |
| DE | 102011017468 A1 | * | 10/2012 | B62D 27/02 |
| DE | 102012112313 | * | 6/2014 | B62D 21/00 |
| DE | 102013100585 | * | 7/2014 | B62D 25/08 |
| DE | 102013101396 | * | 8/2014 | B62D 25/08 |
| EP | 1754651 A2 | * | 2/2007 | B62D 23/00 |
| JP | 2005-132125 A | | 5/2005 | |
| JP | 2009-120063 A | | 6/2009 | |
| JP | 2010-076472 A | | 4/2010 | |
| KR | 1020020047706 A | | 6/2002 | |
| WO | WO 2012001932 A1 | * | 1/2012 | B62D 25/20 |
| WO | WO 2013027602 A1 | * | 2/2013 | B62D 21/02 |
| WO | WO 2013183360 A1 | * | 12/2013 | B62D 29/04 |
| WO | WO 2014063687 A2 | * | 5/2014 | B62D 21/08 |

* cited by examiner

FIG.1

Prior Art

VEHICLE BODY HAVING REAR SIDE MEMBER

CROSS-REFERENCE TO RELATED APPLICATION

The present application claims priority of Korean Patent Application Number 10-2013-0094663 filed Aug. 9, 2013, the entire contents of which application is incorporated herein for all purposes by this reference.

BACKGROUND OF INVENTION

1. Field of Invention

The present invention relates to a common vehicle body having rear side members which simplifies a manufacturing process using an improved structure and reduces weight thereof, when a rear cross member rear, a rear cross member front, and a rear cross panel are joined to the rear side members.

2. Description of Related Art

In general, a vehicle body is manufactured by joining panels, brackets, side members, and the like using a welding method or the like.

Figure 1:
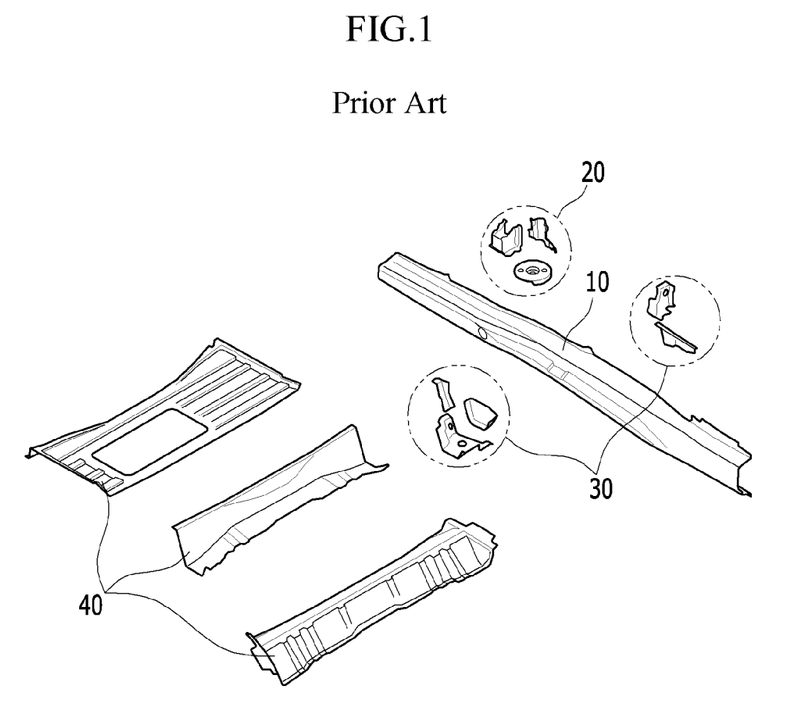
FIG. 1 is an exploded perspective view of a common vehicle body having rear side members of the related art (prior art).

FIG. 1 is an exploded perspective view of a common vehicle body having rear side members of the related art (prior art).

Referring to FIG. 1, the common vehicle body having rear side members includes a rear side member 10, a spring seat bracket 20, sub frame brackets 30, and rear side panels 40. Because the vehicle body having the rear side members has a number of brackets, a number of related components, and complicated joining processes, overall manufacturing costs are increased.

In addition, precision of a finished product manufactured by joining several components may be degraded, and durability and stability may deteriorate due to defects in welded portions.

Therefore, it is necessary to reduce the number of components, the number of manufacturing processes, and weight, and reinforce overall flexural rigidity and torsional rigidity.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a vehicle body having rear side members capable of reducing the number of main constituent components, the number of manufacturing processes, and weight thereof, and improving flexural rigidity and torsional rigidity.

Various aspects of the present invention provide for a vehicle body having rear side members including: rear side members disposed at both sides of the vehicle body; a rear cross member rear having both end portions fixed to the rear side members; a rear cross member front having both end portions fixed to the rear side members, and disposed in front of the rear cross member rear; and a rear cross panel having a lower surface that is supported on and joined to the rear side members, the rear cross member rear, and the rear cross member front.

A first flange to which the rear cross member rear is mounted from an upper side to a lower side may be formed on an inner surface of the rear side member, and the first flange may include: a lower flange joined to a lower surface of the rear cross member rear; a front flange joined to a front surface of the rear cross member rear; and a rear flange joined to a rear surface of the rear cross member rear.

A second flange to which the rear cross member front is mounted from a front side to a rear side may be formed on an inner surface of the rear side member, and the second flange may include: a lower flange joined to a lower surface of the rear cross member front; a rear flange joined to a rear surface of the rear cross member front; and an upper flange joined to an upper surface of the rear cross member front.

A third flange, which is joined to a lower surface of the rear cross panel, may be formed on a front surface or a rear surface of the rear cross member rear or the rear cross member front.

A fourth flange, which is joined to a lower surface of the rear cross panel, may be formed on one surface of the rear side member so as to correspond to the third flange.

The rear side member may include an upper member, a lower member, or a side member that is integrally formed, and a reinforcing rib may be formed to connect the upper member, the lower member, or the side member.

A spring seat integrating portion, which is connected to suspension, may be integrally formed with the rear side member so as to correspond to a portion of the rear side member, which is connected to the rear cross member rear, and a sub frame integrating portion, which is connected to a sub frame, may be integrally formed with the rear side member so as to correspond to a portion of the rear side member, which is connected to the rear cross member front.

The front flange and the rear flange may become far away from each other in an upward direction at a predetermined angle.

The lower flange and the upper flange may become far away from each other in a forward direction at a predetermined angle.

A rib may be formed on an outer surface of the lower flange or the rear flange.

The rib may connect one surface of the rear side member and one surface of the second flange.

An inclined surface, which is inclined in a direction in which the rear cross member front is mounted, may be formed on a surface of the rear cross member front, which corresponds to the rear side member.

As described above, the vehicle body having rear side members according to various aspects of the present invention may reduce the number of manufacturing processes and weight thereof by reducing the overall number of components, and may improve overall durability and stability by reducing the number of welded portions and improving flexural rigidity and torsional rigidity.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
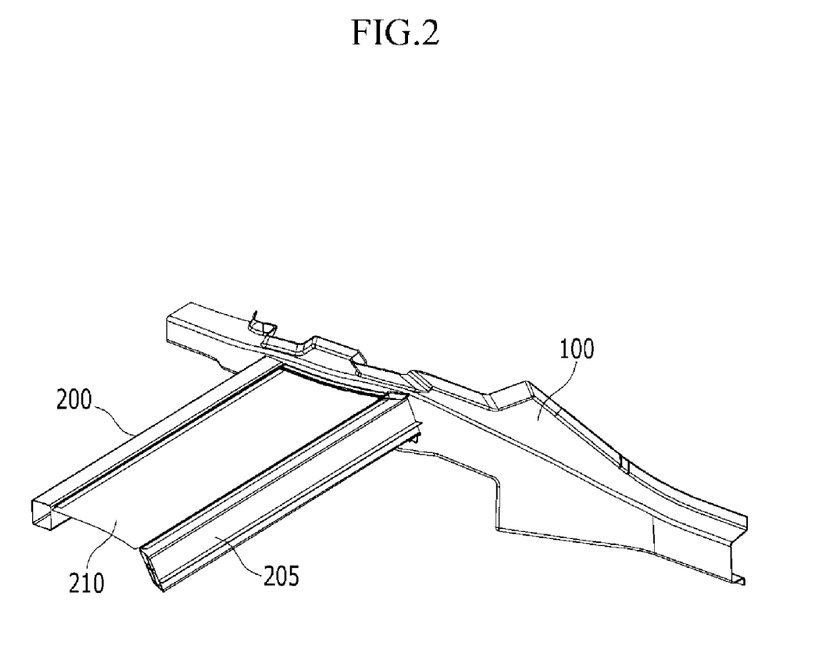
FIG. 2 is a partial perspective view of an exemplary vehicle body having rear side members according to the present invention.
Figure 3:
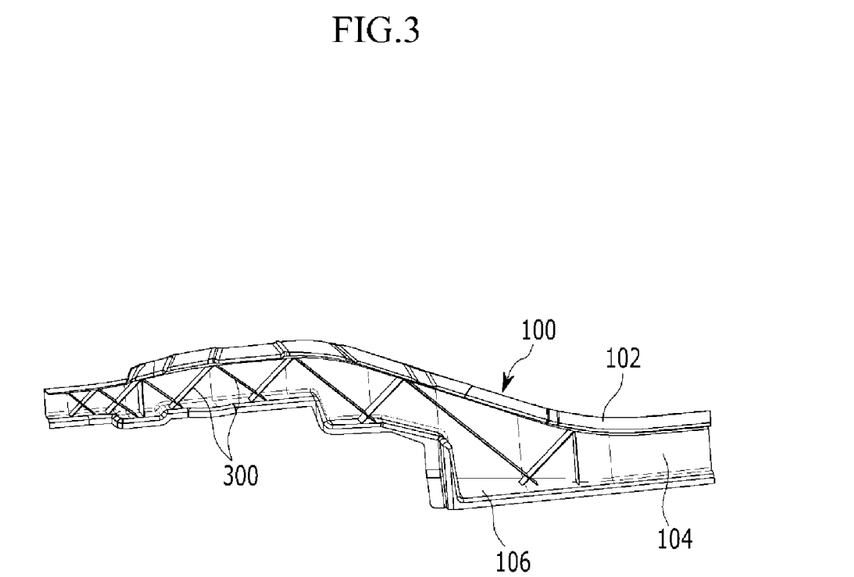
FIG. 3 is a perspective view illustrating an inside of the exemplary rear side member according to the present invention.

FIG. 2 is a partial perspective view of a vehicle body having rear side members according to various embodiments of the present invention, and FIG. 3 is a perspective view illustrating an inside of the rear side member according to various embodiments of the present invention.

Referring to FIG. 2, a vehicle body includes rear side members 100, a rear cross member rear 200, a rear cross member front 205, and a rear cross panel 210.

Referring to FIG. 3, the rear side member 100 includes an upper member 102, a lower member 106, and a side member 104 configured to connect the upper member 102 and the lower member 106, and reinforcing ribs 300 are formed inside the upper member 102, the lower member 106, and the side member 104.

The reinforcing ribs 300 are joined to the upper member 102, the lower member 106, and the side member 104, respectively, so as to improve overall flexural rigidity and torsional rigidity of the rear side member 100. In addition, the reinforcing ribs 300 are disposed to intersect each other, thereby further improving rigidity.

Figure 4:
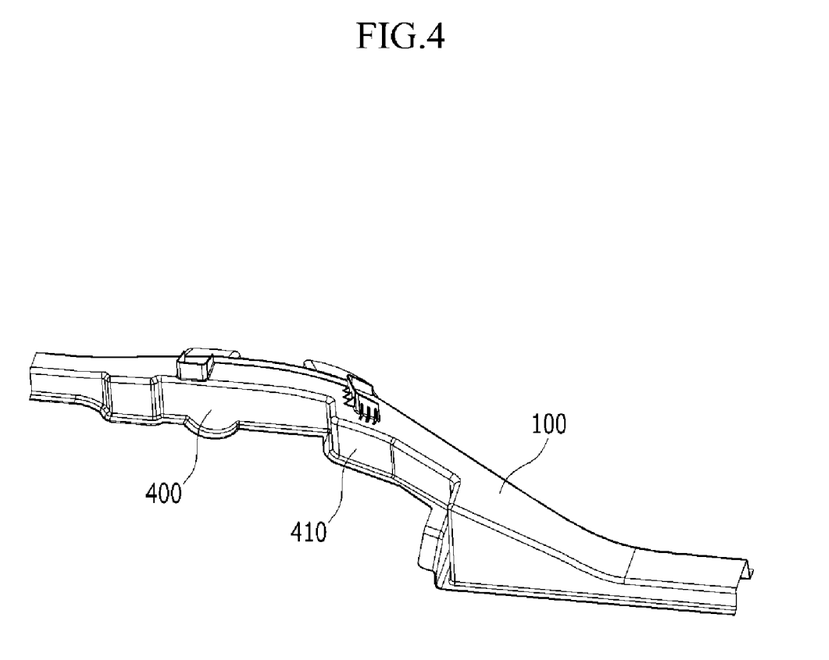
FIG. 4 is a perspective view illustrating an outside of the exemplary rear side member according to the present invention.

FIG. 4 is a perspective view illustrating an outside of the rear side member according to various embodiments of the present invention.

Referring to FIG. 4, a spring seat integrating portion 400 and a sub frame integrating portion 410 are formed on the rear side member 100. That is, spring seat brackets and several sub frame brackets are integrally formed on the rear side member 100, thereby reducing the overall numbers of components and processes and improving durability and rigidity. One will appreciate that such integral components may be monolithically formed.

Figure 5A:
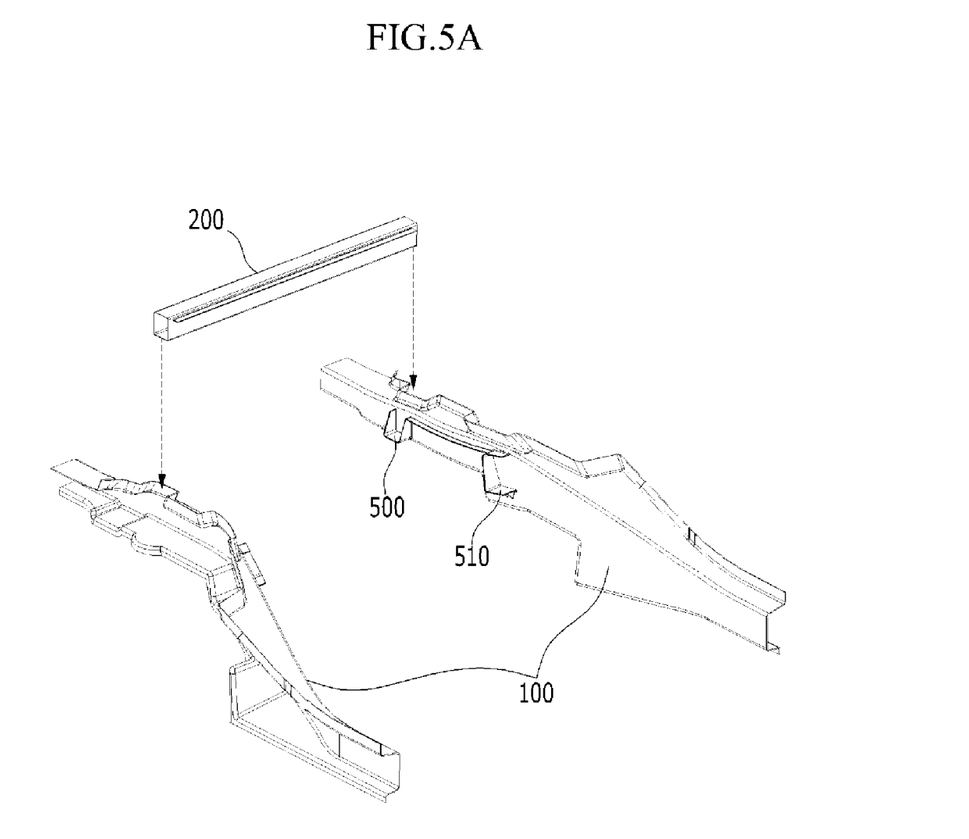
FIG. 5A is a partial exploded perspective view illustrating an exemplary method of mounting a rear cross member rear to the rear side members according to the present invention.

FIG. 5A is a partial exploded perspective view illustrating a method of mounting the rear cross member rear to the rear side members according to various embodiments of the present invention.

Referring to FIG. 5A, the rear side members 100 are disposed at a predetermined interval, and the rear cross member rear 200 is moved from an upper side to a lower side and then engaged with the rear side members 100.

A first flange 500 and a second flange 510 are formed on the rear side member 100, and the rear cross member rear 200 is engaged with and joined to the first flange 500.

Figure 5B:
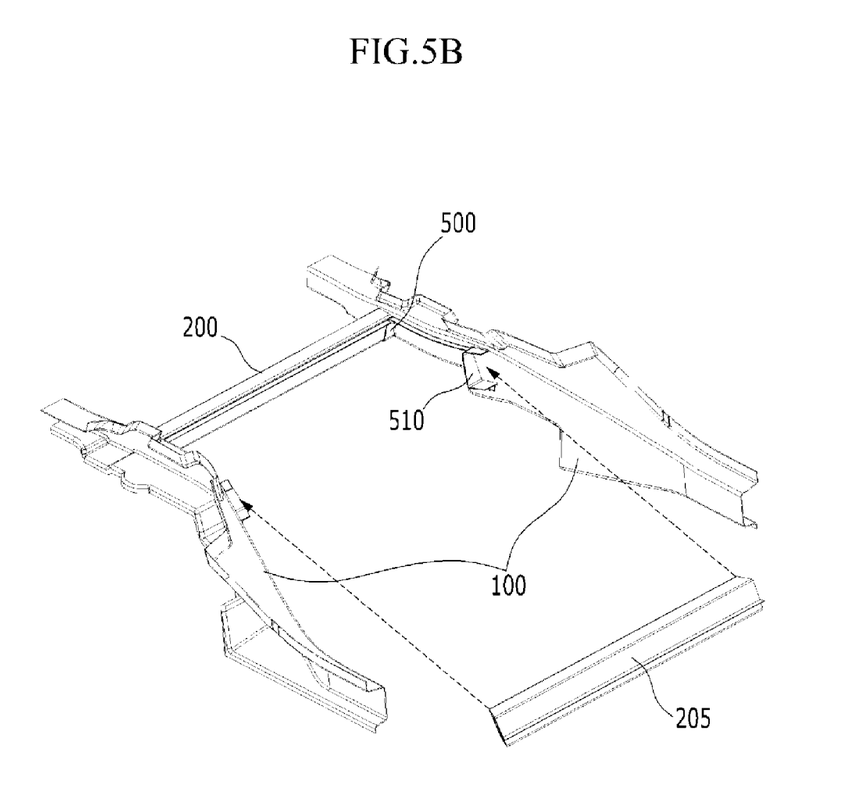
FIG. 5B is a partial exploded perspective view illustrating an exemplary method of mounting a rear cross member front to the rear side members according to the present invention.

FIG. 5B is a partial exploded perspective view illustrating a method of mounting the rear cross member front to the rear side members according to various embodiments of the present invention.

Referring to FIG. 5B, the rear cross member front 205 is moved from a front side to a rear side and then engaged with and joined to the second flange 510 of the rear side member 100.

Figure 5C:
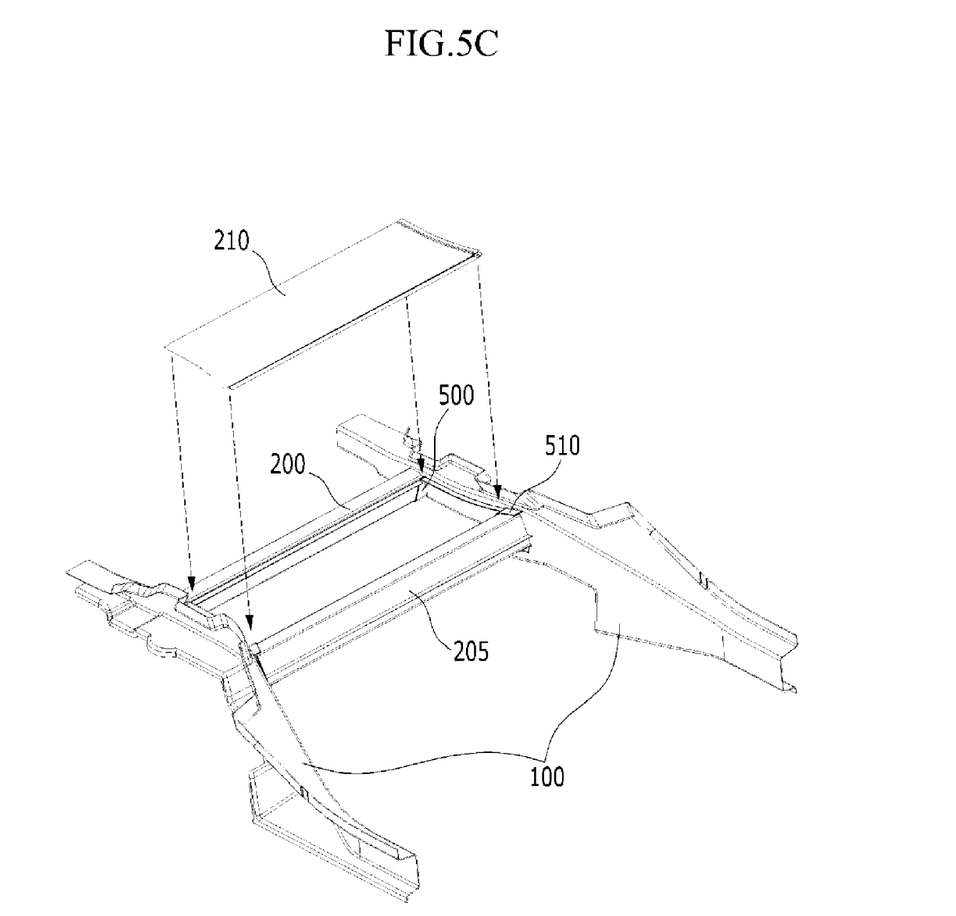
FIG. 5C is a partial exploded perspective view illustrating an exemplary method of mounting a rear cross panel to the rear side members according to the present invention.

FIG. 5C is a partial exploded perspective view illustrating a method of mounting the rear cross panel to the rear side members according to various embodiments of the present invention.

Referring to FIG. 5C, the rear cross panel 210 is moved from an upper side to a lower side and then joined and fixed to the rear cross member rear 200, the rear cross member front 205, and the rear side members 100.

Figure 6A:
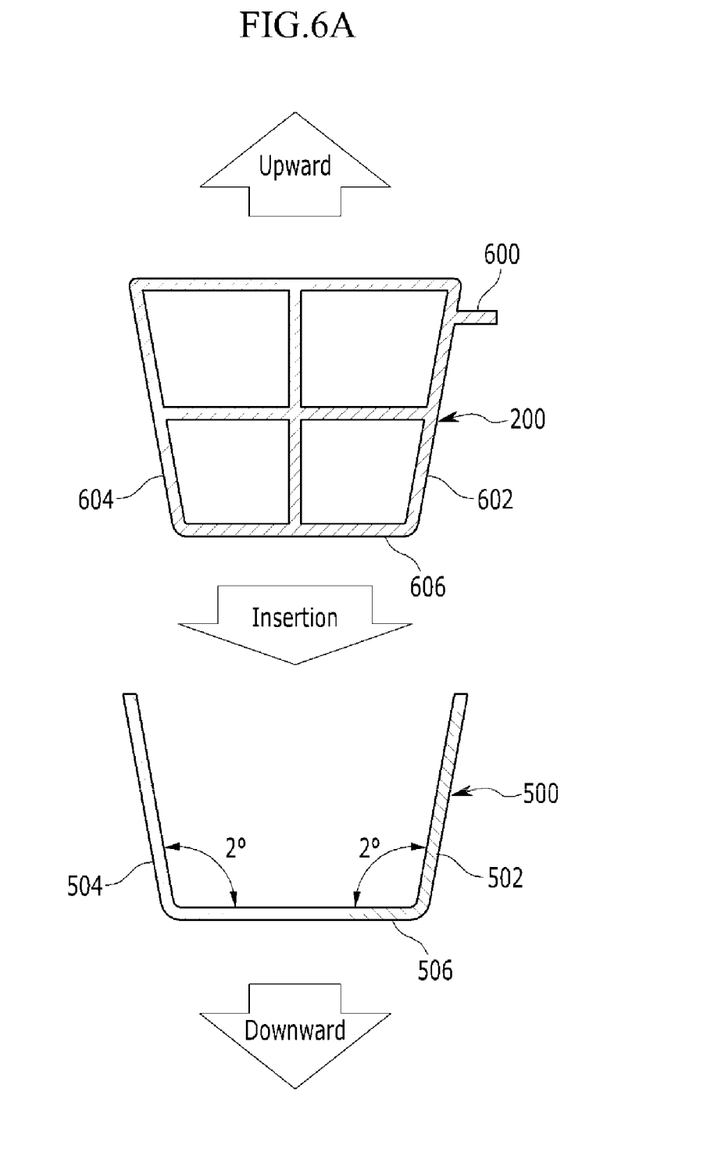
FIG. 6A is a partial exploded sectional view illustrating an exemplary method of mounting the rear cross member rear to the rear side member according to the present invention.

FIG. 6A is a partial exploded sectional view illustrating a method of mounting the rear cross member rear to the rear side member according to various embodiments of the present invention.

Referring to FIG. 6A, a front surface 602, a lower surface 606, and a rear surface 604 are formed on the rear cross member rear 200, a third flange 600 is integrally formed at an upper side of the front surface 602, and an edge of a lower surface of the rear cross panel 210 is joined to an upper surface of the third flange 600. One will appreciate that such integral components may be monolithically formed.

Referring to the front surface 602 and the rear surface 604 of the rear cross member rear 200, the front surface 602 and the rear surface 604 become close to each other in a downward direction of the rear cross member rear 200. Further, the first flange 500 includes a front flange 502 corresponding to the front surface 602, a lower flange 506 corresponding to the lower surface 606, and a rear flange 504 corresponding to the rear surface 604.

If the front flange 502 and the rear flange 504 of the first flange 500 become far away from each other in a direction from a lower side to an upper side so as to correspond to the front surface 602 and the rear surface 604 of the rear cross member rear 200, the front surface 602 and the front flange 502 are joined together, the rear surface 604 and the rear flange 504 are joined together, and the lower surface 606 and the lower flange 506 are joined together.

Figure 6B:
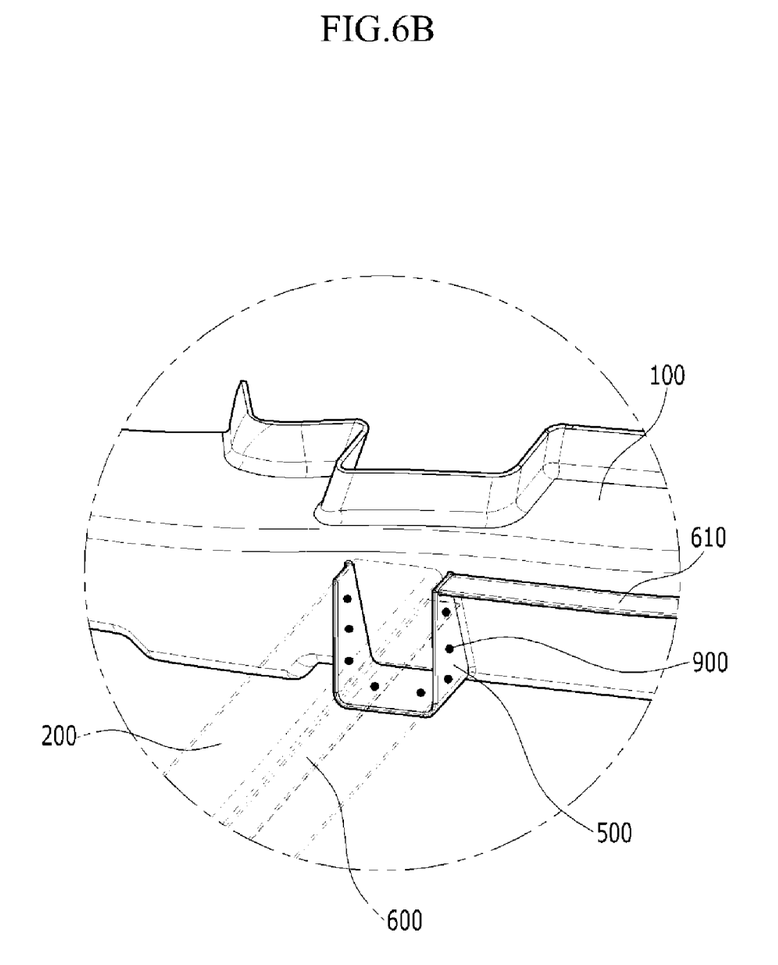
FIG. 6B is a partial perspective view illustrating an exemplary method of mounting the rear cross member rear to the rear side member according to the present invention.

FIG. 6B is a partial perspective view illustrating a method of mounting the rear cross member rear to the rear side member according to various embodiments of the present invention.

Referring to FIG. 6B, a fourth flange 610 is formed on one surface of the rear side member 100 so as to correspond to the third flange 600 formed at the rear cross member rear 200, and upper surfaces of the third flange 600 and the fourth flange 610 are joined to the edge of the lower surface of the rear cross panel 210.

In addition, the first flange 500 and the rear cross member rear 200 are welded to form joining portions 900.

Figure 7A:
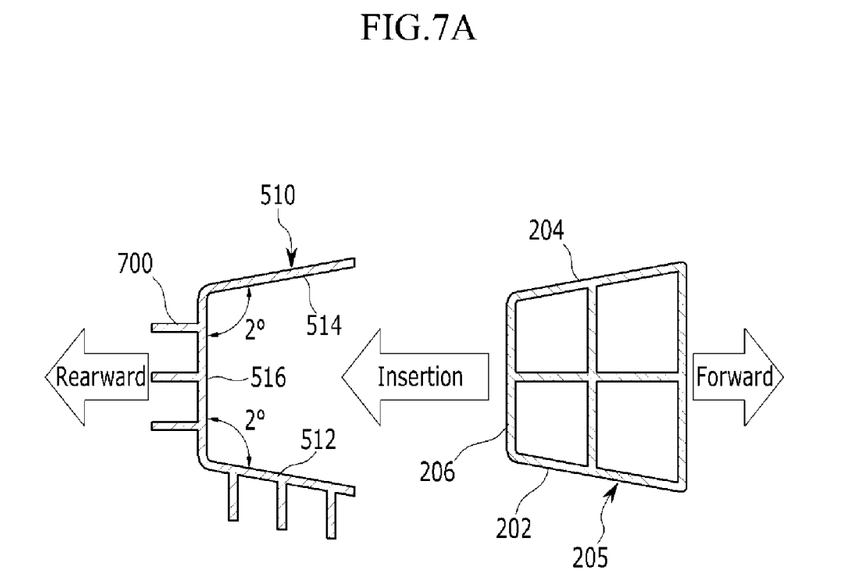
FIG. 7A is an exploded sectional view illustrating an exemplary method of mounting the rear cross member front to the rear side member according to the present invention.

FIG. 7A is an exploded sectional view illustrating a method of mounting the rear cross member front to the rear side member according to various embodiments of the present invention.

Referring to FIG. 7A, a lower surface 202, a rear surface 206, and an upper surface 204 are formed at the rear cross member front 205, and the upper surface 204 and the lower surface 202 become close to each other in a rearward direction.

In addition, the second flange 510 includes a lower flange 512 corresponding to the lower surface 202, an upper flange 514 corresponding to the upper surface 204, and a rear flange 516 corresponding to the rear surface 206, and the upper flange 514 and the lower flange 512 become far away from each other in a forward direction so as to correspond to the shape of the rear cross member front 205.

Figure 7B:
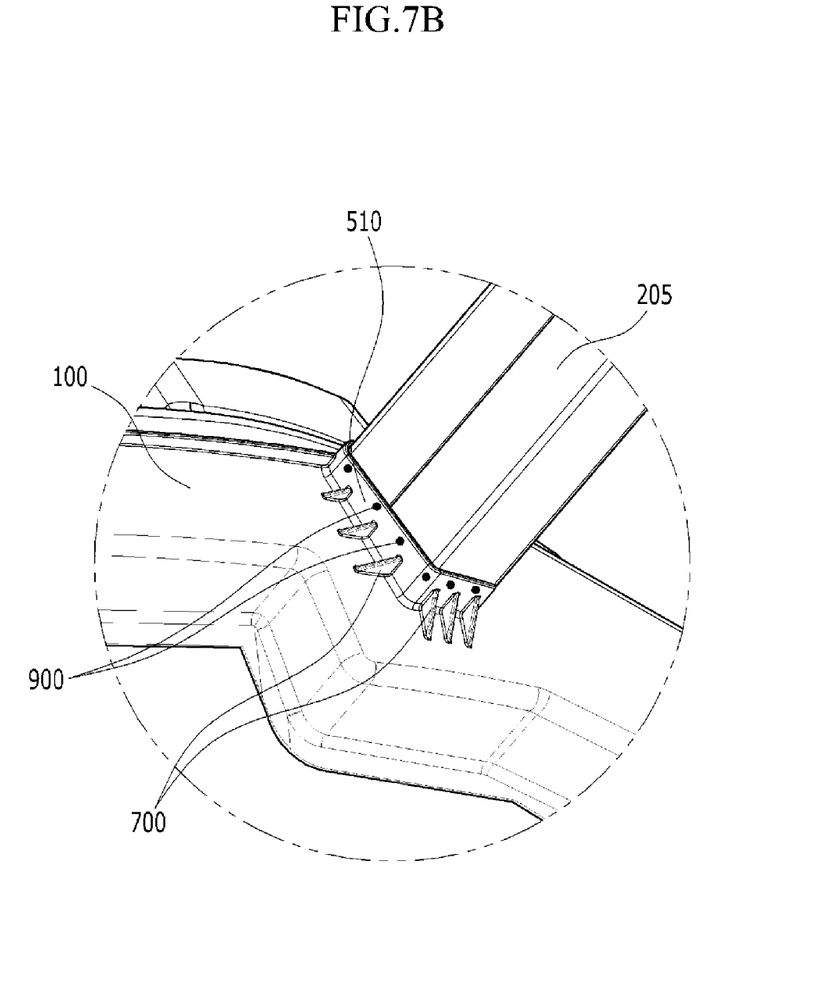
FIG. 7B is a partial perspective view illustrating an exemplary method of mounting the rear cross member front to the rear side member according to the present invention.

FIG. 7B is a partial perspective view illustrating a method of mounting the rear cross member front to the rear side member according to various embodiments of the present invention.

Referring to FIG. 7B, ribs 700 are formed on an outer rear surface and an outer lower surface of the second flange 510, and the ribs 700 connect the second flange 510 and the rear side member 100, thereby improving durability and strength.

In addition, the second flange 510 and the rear cross member front 205 are welded to form joining portions 900.

Figure 7C:
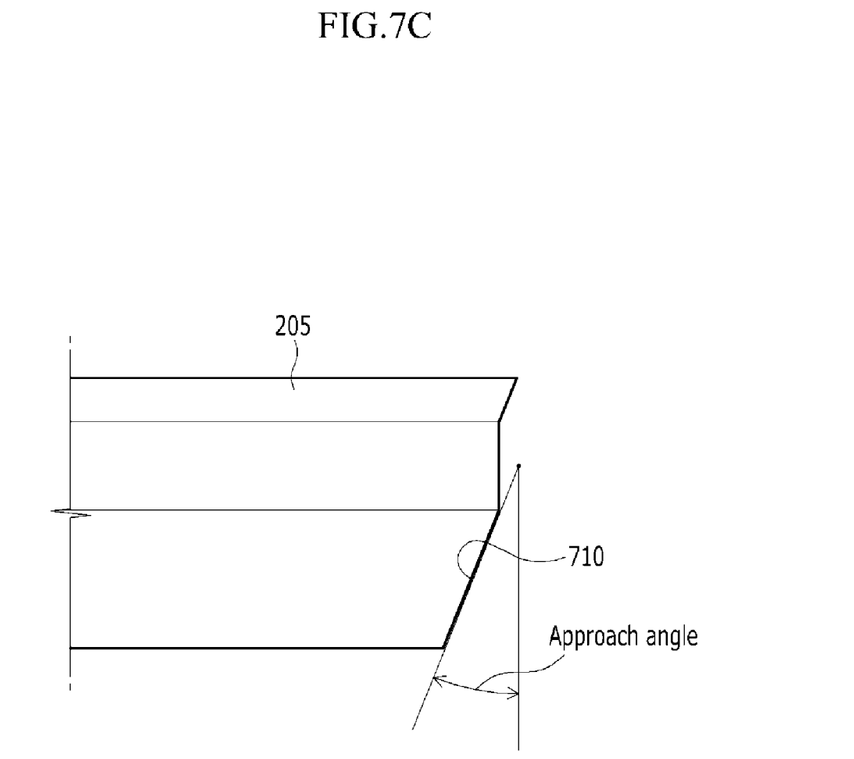
FIG. 7C is a partial top plan view illustrating the exemplary rear cross member front according to the present invention.

FIG. 7C is a partial top plan view illustrating the rear cross member front according to various embodiments of the present invention.

Referring to FIG. 7C, an inclined surface 710, which is inclined inward with respect to a direction in which the rear cross member front 205 is mounted, is formed on each of both end surfaces of the rear cross member front 205 with which the second flange 510 of the rear side member 100 is engaged. Therefore, the rear cross member front 205 is easily engaged with the second flange 510 in accordance with the shape of the rear side members 100.

Figure 8:
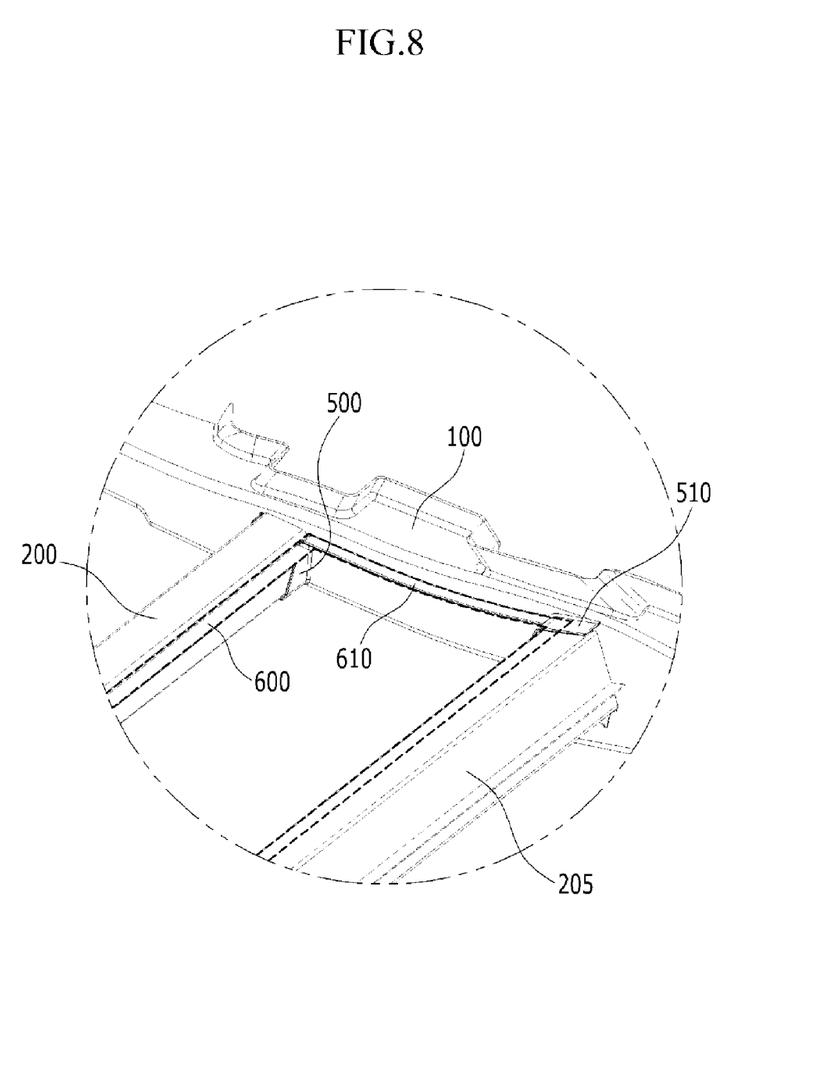
FIG. 8 is a partial perspective view illustrating an exemplary state before the rear cross panel is mounted to the rear side member according to the present invention.

FIG. 8 is a partial perspective view illustrating a state before the rear cross panel is mounted to the rear side member according to various embodiments of the present invention.

Referring to FIG. 8, the edge of the lower surface of the rear cross panel 210 is attached and joined to the third flange 600 formed at the rear cross member rear 200, the fourth flange 610 formed at the rear side member 100, the upper surface of the second flange 510, and an upper surface 204 of the rear cross member front 205.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body comprising:
   rear side members disposed at opposing sides of the vehicle body;
   a rear cross member rear having opposing end portions fixed to the rear side members;
   a rear cross member front having opposing end portions fixed to the rear side members, and disposed in front of the rear cross member rear; and
   a rear cross panel having a lower surface that is supported on and joined to the rear side members, the rear cross member rear, and the rear cross member front,
   wherein an inclined surface, which is inclined in a direction in which the rear cross member front is mounted, is formed on a surface of the rear cross member front, which corresponds to the rear side members.

2. The vehicle body of claim 1, wherein:
   the rear side members include an upper member, a lower member, and a side member that are integrally formed; and
   a reinforcing rib is formed to connect the upper member, the lower member, and the side member.

3. The vehicle body of claim 1, wherein:
   a spring seat integrating portion, which is connected to suspension, is integrally formed with the rear side members so as to correspond to a portion of the rear side members, which are connected to the rear cross member rear; and
   a sub frame integrating portion, which is connected to a sub frame, is integrally formed with the rear side members so as to correspond to a portion of the rear side members, which are connected to the rear cross member front.

4. The vehicle body of claim 1, wherein:
   a first flange to which the rear cross member rear is mounted from an upper side to a lower side is formed on an inner surface of the rear side members; and
   the first flange includes:
     a lower flange joined to a lower surface of the rear cross member rear;
     a front flange joined to a front surface of the rear cross member rear; and
     a rear flange joined to a rear surface of the rear cross member rear.

5. The vehicle body of claim 4, wherein:
   the front flange and the rear flange become far away from each other in an upward direction at a predetermined angle.

6. The vehicle body of claim 1, wherein:
   a third flange, which is joined to a lower surface of the rear cross panel, is formed on a front surface of the rear cross member rear or the rear.

7. The vehicle body of claim 6, wherein:
   a fourth flange, which is joined to a lower surface of the rear cross panel, is formed on one surface of the rear side members so as to correspond to the third flange.

8. The vehicle body of claim 1, wherein:
a second flange to which the rear cross member front is mounted from a front side to a rear side is formed on an inner surface of the rear side members; and
the second flange includes:
   a lower flange joined to a lower surface of the rear cross member front;
   a rear flange joined to a rear surface of the rear cross member front; and
   an upper flange joined to an upper surface of the rear cross member front.

9. The vehicle body of claim 8, wherein:
the lower flange and the upper flange become far away from each other in a forward direction at a predetermined angle.

10. The vehicle body of claim 8, wherein:
a rib is formed on an outer surface of the lower flange or the rear flange.

11. The vehicle body of claim 10, wherein:
the rib connects one surface of the rear side members and one surface of the second flange.

\* \* \* \* \*